(12) United States Patent
Omori

(10) Patent No.: US 8,095,934 B2
(45) Date of Patent: Jan. 10, 2012

(54) DATA DELIVERY SYSTEM, DATA DELIVERY METHOD, AND COMPUTER PROGRAM PRODUCT

(75) Inventor: Tetsuhiko Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 978 days.

(21) Appl. No.: 12/044,136

(22) Filed: Mar. 7, 2008

(65) Prior Publication Data

US 2008/0229306 A1    Sep. 18, 2008

(30) Foreign Application Priority Data

Mar. 15, 2007 (JP) ................. 2007-067445

(51) Int. Cl.
*G06F 9/50* (2006.01)
(52) U.S. Cl. ............. 718/105; 718/102; 712/34; 712/36
(58) Field of Classification Search .................. 718/100, 718/101, 102, 105; 712/32, 34, 35, 36
See application file for complete search history.

(56) References Cited

U.S. PATENT DOCUMENTS

| | | | | |
|---|---|---|---|---|
| 5,767,985 A | * | 6/1998 | Yamamoto et al. | ........... 358/402 |
| 5,918,226 A | * | 6/1999 | Tarumi et al. | ........................ 1/1 |
| 6,081,895 A | * | 6/2000 | Harrison et al. | .............. 713/189 |
| 6,775,705 B2 | * | 8/2004 | Maeda | .......................... 709/230 |
| 6,956,662 B1 | | 10/2005 | Kamimura | |
| 7,052,190 B2 | | 5/2006 | Ishii et al. | |
| 7,110,131 B2 | * | 9/2006 | Nakata et al. | ................. 358/1.15 |
| 2003/0120736 A1 | * | 6/2003 | Eguchi | .......................... 709/206 |
| 2003/0189733 A1 | * | 10/2003 | Kim | .............................. 358/402 |
| 2005/0021647 A1 | * | 1/2005 | Maeda | .......................... 709/206 |
| 2006/0059570 A1 | * | 3/2006 | Kawabuchi et al. | ............ 726/28 |
| 2006/0165459 A1 | | 7/2006 | Ishii | |
| 2009/0013023 A1 | * | 1/2009 | Kato et al. | ..................... 709/201 |

FOREIGN PATENT DOCUMENTS

| | | |
|---|---|---|
| JP | 11-219393 | 8/1999 |
| JP | 11-224296 | 8/1999 |
| JP | 2005-56115 | 3/2005 |
| JP | 2006-215669 | 8/2006 |

* cited by examiner

*Primary Examiner* — Aimee Li
(74) *Attorney, Agent, or Firm* — Dickstein Shapiro LLP

(57) ABSTRACT

In a first data delivery apparatus, a user-input receiving unit receives data and a request for executing a workflow, a first data processing unit processes the data based on the workflow, a destination obtaining unit obtains a destination from the workflow, and a transferring unit transfers the data, the workflow, and a progress of the workflow to the destination. In a second data delivery apparatus, a transfer receiving unit receives the data, the workflow, and the progress of the workflow, a workflow executing unit executes the workflow from a non-executed part based on the progress of the workflow, and a data delivery unit delivers data to other destination.

8 Claims, 13 Drawing Sheets

DATA DELIVERY SYSTEM, DATA DELIVERY METHOD, AND COMPUTER PROGRAM PRODUCT

CROSS-REFERENCE TO RELATED APPLICATIONS

The present application claims priority to and incorporates by reference the entire contents of Japanese priority document 2007-067445 filed in Japan on Mar. 15, 2007.

BACKGROUND OF THE INVENTION

1. Field of the Invention

The present invention relates to a technology for delivering data in a data delivery system.

2. Description of the Related Art

Conventionally, a data delivery system is used to process data in a specified manner and deliver the processed data to another system. For example, in a data delivery system, a tag image file format (TIFF) image data can be read by using a multifunction product (MFP) having various functions such as printing, scanning, and facsimile, subjected to bitmap (BMP) conversion and optical character recognition (OCR) processing, and delivered to another system via an e-mail.

FIG. 17 is a diagram for explaining an exemplary workflow of data delivery in a conventional data delivery system. FIG. 18 is a diagram for explaining an exemplary workflow in which one or more of workflow processing jobs are processed in a different system. A workflow is a sequence of workflow processing jobs performed in a data delivery system.

It is possible for a user to define a workflow in such a way that only a specific workflow processing job such as an OCR processing job is processed in a separate system (refer to FIG. 18). For example, in a conventional data delivery system shown in FIG. 19, an MFP 500 reads TIFF image data and sends the TIFF image data and a corresponding workflow to a data delivery server 600 from. The data delivery server 600 converts the TIFF image data into BMP image data and delivers the BMP data to a separate system 700 for OCR processing. The workflow can be defined such that the separate system 700 returns the OCR-processed data to the data delivery server 600 and the data delivery server 600 delivers the OCR-processed data to a file transfer protocol (FTP) mail server via an e-mail. Such a configuration facilitates in achieving a certain degree of load sharing of workflow processing jobs between a plurality of apparatuses and systems.

Moreover, Japanese Patent Application Laid-Open No. 2005-56115 discloses a workflow related device that enables to set up independent sessions of a plurality of workflow systems to eliminate system-dependency between the workflow systems. Furthermore, Japanese Patent Application Laid-Open No. H11-219393 discloses a workflow support system in which processing of an electronic document can be requested to a substitutional user if an administrator of a system workflow is absent.

However, the data delivery server 600 in the conventional data delivery system needs to manage all the workflow processing jobs in a workflow. More particularly, the data delivery server 600 first delivers the workflow to the separate system 700 for OCR processing and obtains back the OCR-processed data from the separate system 700. The data delivery server 600 then performs e-mail delivery of the OCR-processed data. Thus, although some load sharing of workflow processing jobs is possible by using the separate system 700, the data delivery server 600 does not become free until all the workflow processing jobs are complete. That prevents efficient load sharing of workflow processing jobs.

Moreover, it is not possible to request a substitutional user midway through a workflow to perform a workflow processing job.

SUMMARY OF THE INVENTION

It is an object of the present invention to at least partially solve the problems in the conventional technology.

According to an aspect of the present invention, there is provided a data delivery system including a plurality of data delivery apparatuses that process input data based on a predefined workflow. The data delivery apparatuses including at least a first data delivery apparatus that receives a request for executing the workflow from a user and a second data delivery apparatus that receives a request for completing a partly executed workflow. The first data delivery apparatus includes a user-input receiving unit that receives target data to be processed and the request for executing the workflow, a first data processing unit that processes the target data following a workflow definition defined in the workflow, a destination obtaining unit that obtains a transfer destination data delivery apparatus described in the workflow, and a transferring unit that transfers the target data, the workflow definition, and a progress of the workflow to the transfer destination data delivery apparatus. The second data delivery apparatus includes a transfer receiving unit that receives the target data, the workflow definition, and the progress of the workflow from other data delivery apparatus, a workflow executing unit that executes the workflow from a non-executed part based on the progress of the workflow, and a data delivery unit that delivers data to other destination.

Furthermore, according to another aspect of the present invention, there is provided a method of delivering data in a data delivery system including a plurality of data delivery apparatuses that process input data based on a predefined workflow. The data delivery apparatuses including at least a first data delivery apparatus that receives a request for executing the workflow from a user and a second data delivery apparatus that receives a request for completing a partly executed workflow. The method includes, using the first data delivery apparatus, the following steps: receiving target data to be processed; receiving the request for executing the workflow; processing the target data defined in the workflow; obtaining the location of a transfer destination data delivery apparatus described in the workflow; registering a plurality of transfer destination data delivery apparatuses; setting a priority to a plurality of registered transfer destination data delivery apparatuses; selecting a transfer destination data delivery apparatus from the registered transfer destination data delivery apparatuses based on the priority; monitoring a processing load of the transfer destination data delivery apparatus; changing the priority based on a result of monitoring the processing load; transferring the target data, the workflow definition, and a progress of the workflow to the transfer destination data delivery apparatus. Using the second data delivery apparatus, the method also includes the following steps: receiving the target data, the workflow definition, and the progress of the workflow from other data delivery apparatus; executing the workflow from a non-executed part based on the progress of the workflow; and delivering data to other destination.

Moreover, according to yet another aspect of the present invention, there is provided a computer program product comprising a computer-usable medium having computer-readable program codes embodied in the medium, for delivering data in a data delivery system. The data delivery system includes a plurality of data delivery apparatuses that process input data based on a predefined workflow. The plurality of data delivery apparatuses includes at least a first data delivery apparatus that receives a request for executing the workflow from a user and a second data delivery apparatus that receives a request for completing a partly executed workflow. The workflow causes a computer to execute, in a first data delivery apparatus, receiving target data; processing the target data defined in the workflow; obtaining the location of a transfer destination data delivery apparatus described in the workflow; registering a plurality of transfer destination data delivery apparatuses; setting a priority to a plurality of registered transfer destination data delivery apparatuses; selecting a transfer destination data delivery apparatus from the registered transfer destination data delivery apparatuses based on the priority; monitoring a processing load of the transfer destination data delivery apparatus; changing the priority based on a result of monitoring the processing load; transferring the target data, the workflow definition, and a progress of the workflow to the transfer destination data delivery apparatus. Using the second data delivery apparatus, the computer also executes the following steps: receiving the target data, the workflow definition, and the progress of the workflow from other data delivery apparatus; executing the workflow from a non-executed part based on the progress of the workflow; and delivering data to other destination.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
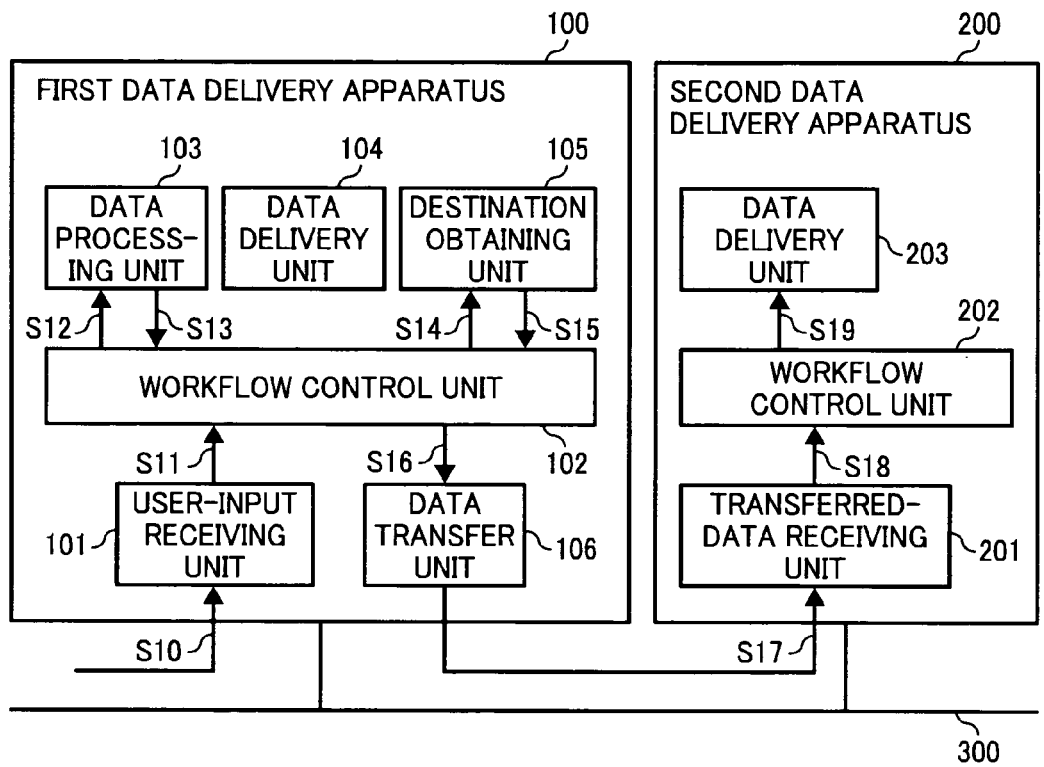
FIG. 1 is a schematic diagram of a data delivery system according to a first embodiment of the present invention.
Figure 2:
FIG. 2 is a diagram for explaining an exemplary workflow of data delivery in the data delivery system according to the first embodiment.

FIG. 1 is a schematic diagram of a data delivery system according to a first embodiment of the present invention. FIG. 2 is a diagram for explaining an exemplary workflow of data delivery in the data delivery system according to the first embodiment. The data delivery system according to the first embodiment includes a first data delivery apparatus 100 and a second data delivery apparatus 200 connected via a network 300. Each of the first data delivery apparatus 100 and the second data delivery apparatus 200 performs workflow processing jobs on input data based on a workflow defined in advance. More particularly, upon receiving a request from a user to perform workflow processing jobs on input data based on a workflow, the first data delivery apparatus 100 performs some of the requested workflow processing jobs and then requests the second data delivery apparatus 200 midway through to perform the remaining workflow processing jobs.

The first data delivery apparatus 100 includes a user-input receiving unit 101, a workflow control unit 102, a data processing unit 103, a data delivery unit 104, a destination obtaining unit 105, and a data transfer unit 106.

The user-input receiving unit 101 receives data and a workflow definition for processing the data via a user input.

The workflow control unit 102 controls the processing of workflow processing jobs on the input data.

The data processing unit 103 performs a workflow processing job of data processing upon receiving instructions from the workflow control unit 102.

The data delivery unit 104 performs a workflow processing job of delivering data upon receiving instructions from the workflow control unit 102. However, according to the first embodiment, the data delivery unit 104 is not used because the workflow does not include a data delivery job (e.g., an e-mail delivery job) for the data delivery unit 104. The data delivery unit 104 is used only when a workflow includes a data delivery job.

The destination obtaining unit 105 performs a workflow processing job of obtaining location of a destination registered in the workflow and sends that information to the workflow control unit 102.

The data transfer unit 106 receives the processed data, the corresponding workflow definition, and the status of workflow processing from the workflow control unit 102, and performs a workflow processing job of transferring that information to the destination obtained by the destination obtaining unit 105.

Thus, to sum up, after a user inputs data and the corresponding workflow, the user-input receiving unit 101 requests the workflow control unit 102 to perform necessary workflow processing jobs on the input data. The workflow control unit 102 first instructs the data processing unit 103 to perform data processing and obtains the processed data. The workflow control unit 102 then instructs the data delivery unit 104 to perform data delivery if a data delivery job is defined in the workflow. The workflow control unit 102 also instructs the destination obtaining unit 105 to obtain location of the destination registered in the workflow. Lastly, the workflow control unit 102 sends the necessary information to the data transfer unit 106 that in turn transfers the information to the destination.

The second data delivery apparatus 200 includes a transferred-data receiving unit 201, a workflow control unit 202, and a data delivery unit 203.

The transferred-data receiving unit 201 receives the data, the corresponding workflow, and the status of workflow processing transferred from the first data delivery apparatus 100.

The workflow control unit 202 receives from the transferred-data receiving unit 201 a request to perform necessary workflow processing jobs on the transferred data. In the first embodiment, because the workflow includes an e-mail delivery job, the workflow control unit 202 instructs the data delivery unit 203 to perform e-mail delivery.

The data delivery unit 203 performs the workflow processing job as instructed by the workflow control unit 202. That is, in this case, the data delivery unit 203 performs e-mail delivery of the transferred data.

Given below is the sequence of operations in the workflow processed in the data delivery system according to the first embodiment. The workflow includes workflow processing jobs include conversion of the input data into BMP format in the first data delivery apparatus 100, transfer of the BMP data to the second data delivery apparatus 200, and e-mail delivery of the BMP data in the second data delivery apparatus 200 (refer to FIG. 2).

More particularly, the user-input receiving unit 101 receives data and a workflow definition for processing the data via a user input (Step S10).

The user-input receiving unit 101 then requests the workflow control unit 102 to perform necessary workflow processing jobs on the input data based on the workflow (Step S11).

The workflow control unit 102 instructs the data processing unit 103 to convert the input data into BMP data as defined in the workflow (Step S12).

The workflow control unit 102 obtains the BMP data from the data processing unit 103 (Step S13). In this case, the data delivery unit 104 is not used because the workflow does not include a data delivery job such as an e-mail delivery job for the data delivery unit 104.

Because the next workflow processing job in the workflow is defined to be an e-mail delivery job for the second data delivery apparatus 200, the workflow control unit 102 instructs the destination obtaining unit 105 to obtain the location of the second data delivery apparatus 200 (Step S14). The destination obtaining unit 105 sends that information to the workflow control unit 102 (Step S15).

The workflow control unit 102 then sends the BMP data, the workflow definition, and the status of workflow processing to the data transfer unit 106 (Step S16).

The data transfer unit 106 transfers the received information to the second data delivery apparatus 200 (Step S17).

The transferred-data receiving unit 201 receives the BMP data from the data transfer unit 106 and requests the workflow control unit 202 to perform necessary workflow processing jobs on the BMP data (Step S18).

The workflow control unit 202 instructs the data delivery unit 203 to perform e-mail delivery of the BMP data (Step S19). The workflow is complete when the data delivery unit 203 performs e-mail delivery of the BMP data.

In this way, it is possible for the first data delivery apparatus 100 to perform only one workflow processing job in the workflow and then request the second data delivery apparatus 200 to perform the remaining workflow processing jobs. As a result, it is possible for the first data delivery apparatus 100 to become free from managing one workflow and start managing another workflow. Such a configuration of the data delivery system facilitates in achieving efficient load sharing of workflow processing jobs.

Figure 3:
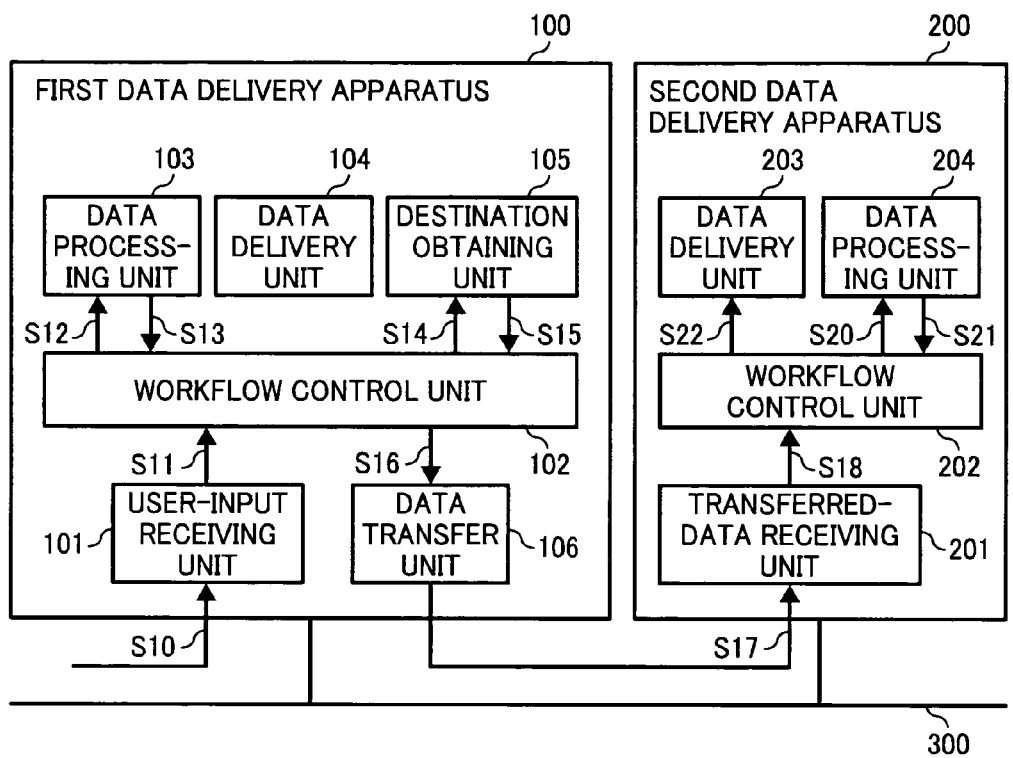
FIG. 3 is a schematic diagram of a data delivery system according to a second embodiment of the present invention.
Figure 4:
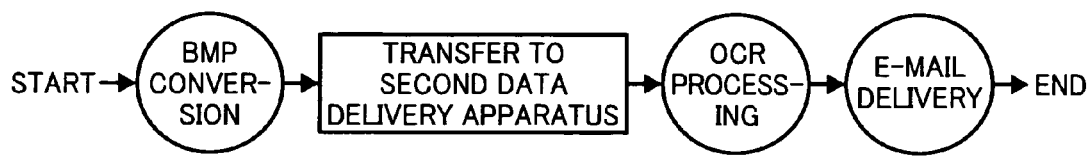
FIG. 4 is a diagram for explaining an exemplary workflow of data delivery in the data delivery system according to the second embodiment.

FIG. 3 is a schematic diagram of a data delivery system according to a second embodiment of the present invention. FIG. 4 is a diagram for explaining an exemplary workflow of data delivery in the data delivery system according to the second embodiment. The data delivery system according to the second embodiment is almost identical to that according to the first embodiment, except that the second data delivery apparatus 200 further includes a data processing unit 204. Moreover, the workflow in FIG. 4 additionally includes an optical character recognition (OCR) job performed in the second data delivery apparatus 200.

The data processing unit 204 performs OCR processing of the BMP data by using a pattern matching method. Apart from the data processing unit 204, the structure of the data delivery system according to the second embodiment is identical to that according to the first embodiment.

Moreover, the sequence of operations in the workflow processed in the data delivery system according to the second embodiment is identical to Steps S10 to S18 according to the first embodiment. Hence, the description of the identical portion is not repeated. However, unlike the first embodiment, the second data delivery apparatus 200 according to the second embodiment is requested to perform an OCR job before performing an e-mail delivery job. Thus, instead of performing Step S19 described in the first embodiment, the workflow control unit 202 instructs the data processing unit 204 to perform OCR processing of the BMP data (Step S20).

The data processing unit 204 possesses standard patterns of the characters that are to be recognized. After comparing the pattern of characters in the BMP data with the standard patterns, the data processing unit 204 outputs the most resembling pattern as OCR data to the workflow control unit 202 (Step S21).

The workflow control unit 202 then instructs the data delivery unit 203 to perform e-mail delivery of the OCR data (Step S22). The workflow is complete when the data delivery unit 203 performs e-mail delivery of the OCR data.

Thus, in addition to performing e-mail delivery as described in the first embodiment, the second data delivery apparatus 200 according to the second embodiment can also perform OCR processing.

Figure 5:
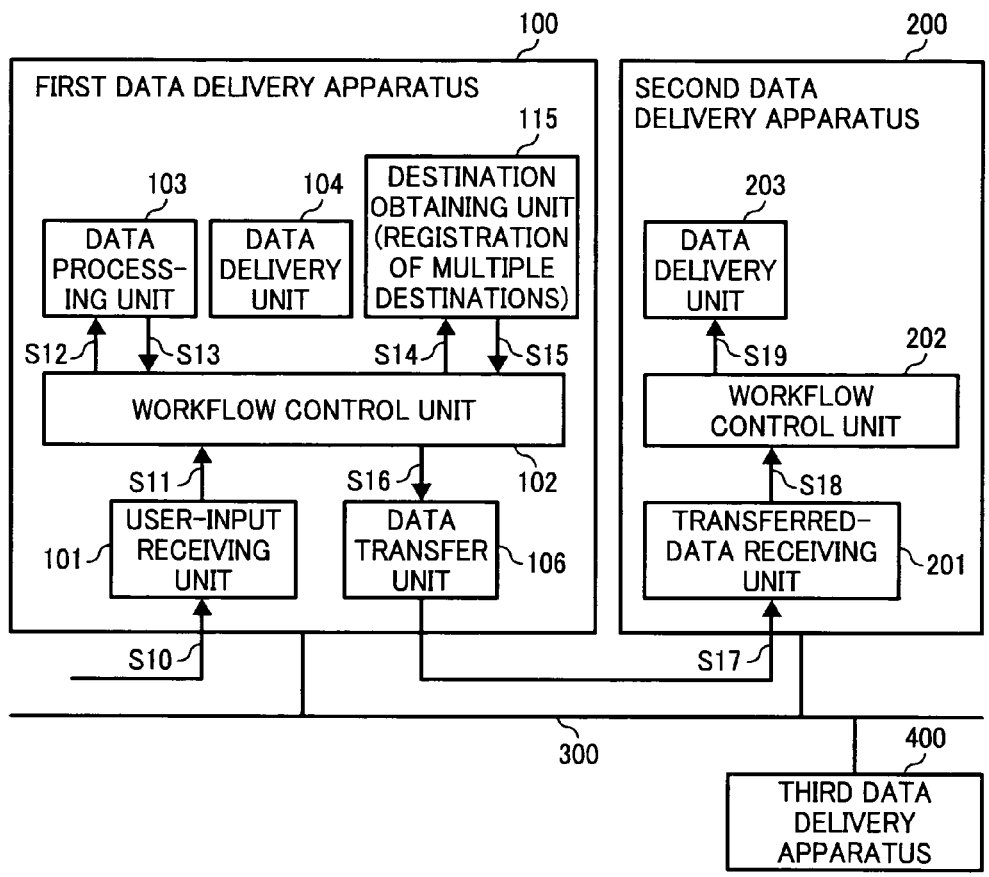
FIG. 5 is a schematic diagram of a data delivery system according to a third embodiment of the present invention.
Figure 6:
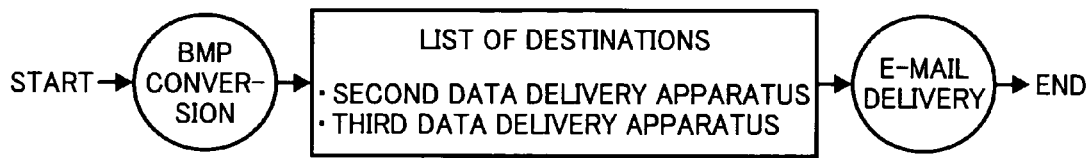
FIG. 6 is a diagram for explaining an exemplary workflow of data delivery in the data delivery system according to the third embodiment.

FIG. 5 is a schematic diagram of a data delivery system according to a third embodiment of the present invention. FIG. 6 is a diagram for explaining an exemplary workflow of data delivery in the data delivery system according to the third embodiment. In the third embodiment, a plurality of destinations can be registered in the workflow such that data can be transferred from the first data delivery apparatus 100 to one or more destinations for performing remaining workflow processing jobs. More particularly, the first data delivery apparatus 100 includes a destination obtaining unit 115 that obtains locations of all the registered destinations and stores therein a list of destinations in a selectively specifiable manner.

The rest of the structure of the data delivery system according to the third embodiment is identical to that according to the first embodiment. Hence, the description of the identical portion is not repeated.

As shown in FIG. 6, the input data is first converted into BMP format in the first data delivery apparatus 100 and the BMP data is transferred to the second data delivery apparatus 200 or a third data delivery apparatus 400 for e-mail delivery. Given below is the detailed sequence of operations in the workflow processed in the data delivery system according to the third embodiment.

As shown in FIG. 5, the user-input receiving unit 101 receives data and a workflow definition for processing the data via a user input (Step S10). The second data delivery apparatus 200 and the third data delivery apparatus 400 are registered as destinations in the workflow. Given below is the description of transferring data to the second data delivery apparatus 200 for e-mail delivery. Similarly, it is also possible to transfer data to the third data delivery apparatus 400 for e-mail delivery.

Upon receiving the input data, the user-input receiving unit 101 requests the workflow control unit 102 to perform necessary workflow processing jobs on the input data based on the workflow (Step S11).

The workflow control unit 102 then instructs the data processing unit 103 to convert the input data into BMP data as defined in the workflow (Step S12).

The workflow control unit 102 obtains the BMP data from the data processing unit 103 (Step S13). Because the next workflow processing job in the workflow is defined to be an e-mail delivery job, the workflow control unit 102 instructs the destination obtaining unit 115 to obtain the locations of the second data delivery apparatus 200 and the third data delivery apparatus 400 (Step S14).

Because the second data delivery apparatus 200 is specified to be the destination for performing the e-mail delivery job, the destination obtaining unit 115 obtains the location of the second data delivery apparatus 200 and sends that information to the workflow control unit 102 (Step S15). Meanwhile, if the third data delivery apparatus 400 is specified to be the destination for performing the e-mail delivery job, the destination obtaining unit 115 obtains the location of the third data delivery apparatus 400 and sends that information to the workflow control unit 102. Moreover, if no destination is specified in the workflow in advance, a destination can be selectively specified from the list of destinations.

The workflow control unit 102 then sends the BMP data, the workflow definition, and the status of workflow processing to the data transfer unit 106 (Step S16).

The data transfer unit 106 transfers the received information to the second data delivery apparatus 200 (Step S17).

The transferred-data receiving unit 201 receives the BMP data from the data transfer unit 106 and requests the workflow control unit 202 to perform necessary workflow processing jobs on the BMP data (Step S18).

The workflow control unit 202 instructs the data delivery unit 203 to perform e-mail delivery of the BMP data (Step S19). The workflow is complete when the data delivery unit 203 performs e-mail delivery of the BMP data.

Thus, in addition to the features according to the first embodiment, it is possible to register a plurality of destinations in the workflow of the data delivery system according to the third embodiment such that data can be transferred to one or more destinations for performing the remaining workflow processing jobs.

Figure 7:
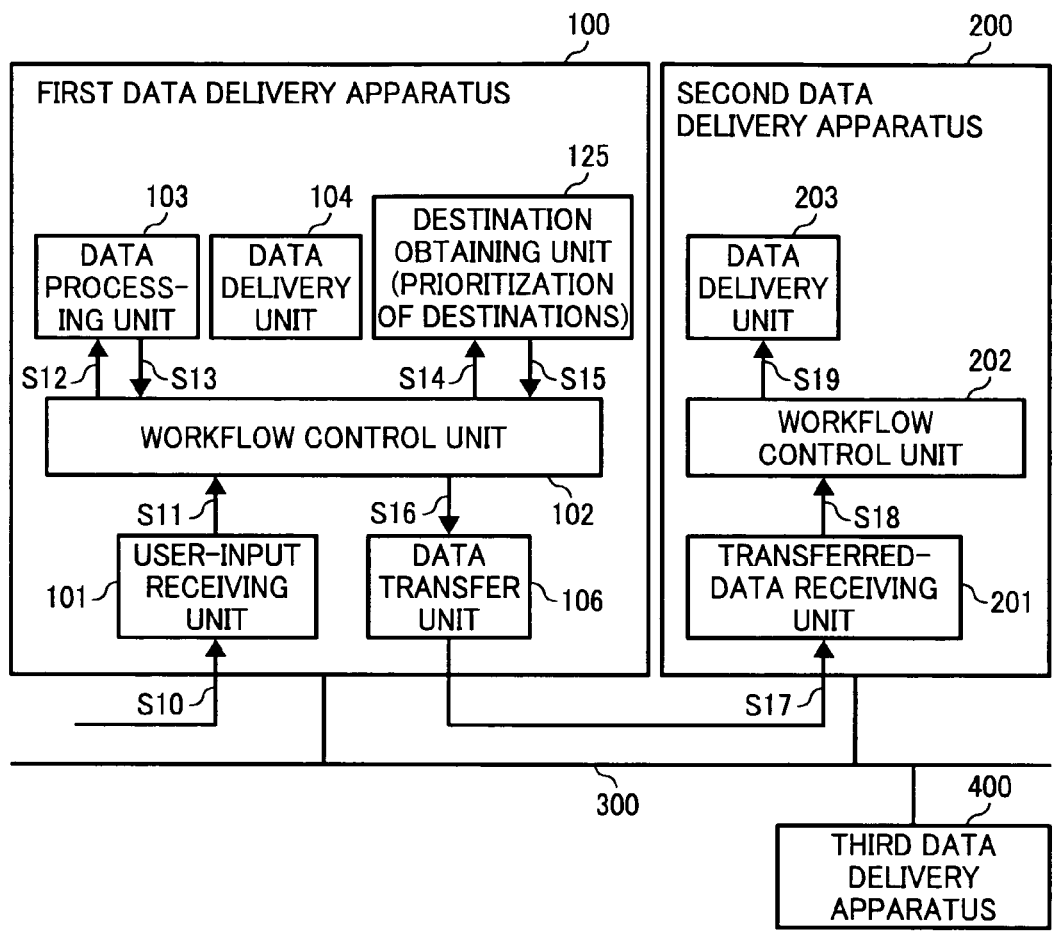
FIG. 7 is a schematic diagram of a data delivery system according to a fourth embodiment of the present invention.
Figure 8:
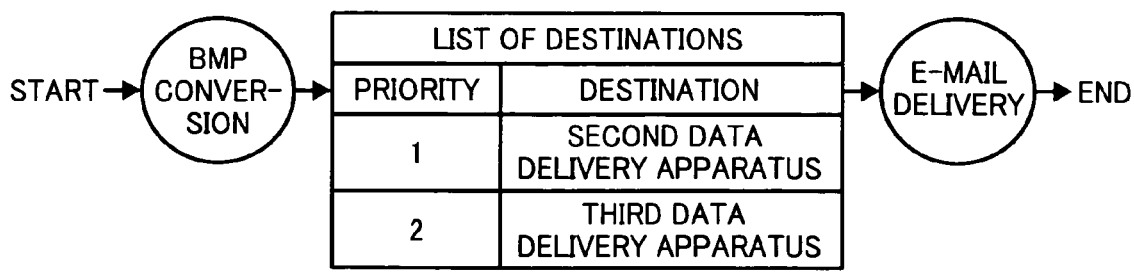
FIG. 8 is a diagram for explaining an exemplary workflow of data delivery in the data delivery system according to the fourth embodiment.

FIG. 7 is a schematic diagram of a data delivery system according to a fourth embodiment of the present invention. FIG. 8 is a diagram for explaining an exemplary workflow of data delivery in the data delivery system according to the fourth embodiment. In addition to registering a plurality of destinations in the workflow as described in the third embodiment, a priority can be attached to each destination in the data delivery system according to the fourth embodiment. More particularly, the first data delivery apparatus 100 according to the fourth embodiment includes a destination obtaining unit 125 that obtains locations of all the registered destinations and stores therein the destinations based on a priority and in a selectively specifiable manner.

The rest of the structure of the data delivery system according to the fourth embodiment is identical to that according to the first embodiment. Hence, the description of the identical portion is not repeated.

As shown in FIG. 8, the input data is converted into BMP format in the first data delivery apparatus 100. The BMP data can be transferred to the second data delivery apparatus 200 or the third data delivery apparatus 400 based on a priority. In the fourth embodiment, the second data delivery apparatus 200 is assumed to have a higher priority as a destination for data transfer than the third data delivery apparatus 400. Given below is the detailed sequence of operations in the workflow processed in the data delivery system according to the fourth embodiment. The sequence of operations is described with respect to only the second data delivery apparatus 200.

First, the user-input receiving unit 101 receives data and a workflow definition for processing the data via a user input (Step S10). The second data delivery apparatus 200 and the third data delivery apparatus 400 are registered as destinations in the workflow. Moreover, the second data delivery apparatus 200 has a higher priority than the third data delivery apparatus 400.

Upon receiving the input data, the user-input receiving unit 101 requests the workflow control unit 102 to perform necessary workflow processing jobs on the input data based on the workflow (Step S11).

The workflow control unit 102 then instructs the data processing unit 103 to convert the input data into BMP data as defined in the workflow (Step S12).

The workflow control unit 102 obtains the BMP data from the data processing unit 103 (Step S13). Because the next workflow processing job in the workflow is defined to be an e-mail delivery job, the workflow control unit 102 instructs the destination obtaining unit 125 to obtain the locations of the second data delivery apparatus 200 and the third data delivery apparatus 400 (Step S14).

Because the second data delivery apparatus 200 is registered to be the destination having highest priority for performing an e-mail delivery job, the destination obtaining unit 125 obtains the location of the second data delivery apparatus 200 and sends that information to the workflow control unit 102 (Step S15).

The workflow control unit 102 then sends the BMP data, the workflow definition, and the status of workflow processing to the data transfer unit 106 (Step S16).

The data transfer unit 106 transfers the received information to the second data delivery apparatus 200 (Step S17). If the data transfer to the second data delivery apparatus 200 fails for some reason, the system control returns to Step S14. In that case, the destination obtaining unit 115 obtains the location of the third data delivery apparatus 400 having second highest priority for performing an e-mail delivery job and sends that information to the workflow control unit 102 (Step S15). The workflow control unit 102 then sends the BMP data, the workflow definition, and the status of workflow processing to the data transfer unit 106 (Step S16). Consequently, the data transfer unit 106 transfers the received information to the third data delivery apparatus 400 (Step S17).

In the case of successful data transfer to the second data delivery apparatus 200, the transferred-data receiving unit 201 receives the BMP data from the data transfer unit 106 and requests the workflow control unit 202 to perform necessary workflow processing jobs on the BMP data (Step S18).

The workflow control unit 202 instructs the data delivery unit 203 to perform e-mail delivery of the BMP data (Step S19). The workflow is complete when the data delivery unit 203 performs e-mail delivery of the BMP data.

Thus, in addition to the features according to the first embodiment, it is possible to register a plurality of destinations in the workflow of the data delivery system according to the fourth embodiment and prioritize them such that data can be transferred to one or more destinations for performing the remaining workflow processing jobs based on the priority.

Figure 9:
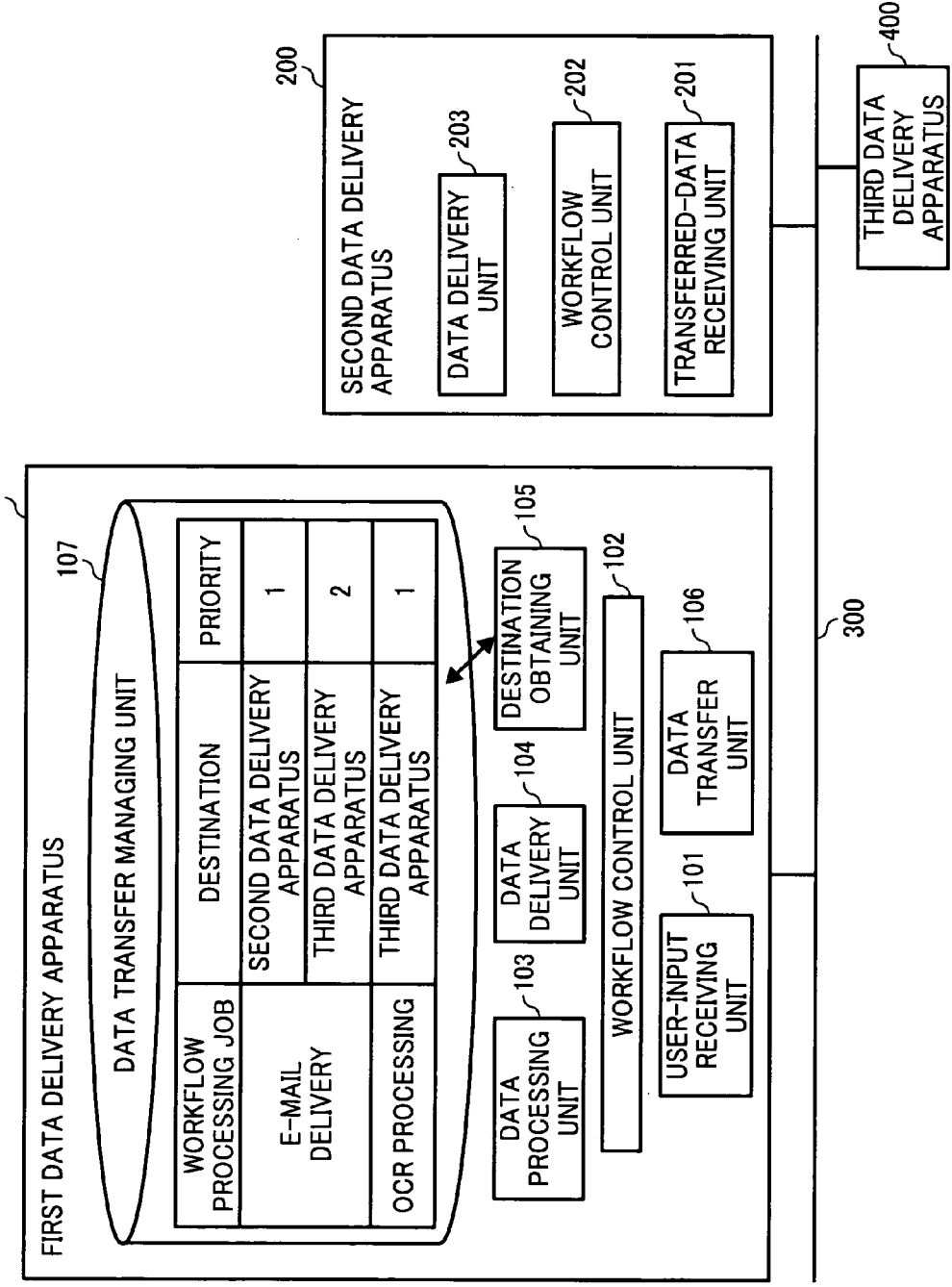
FIG. 9 is a schematic diagram of a data delivery system according to a fifth embodiment of the present invention.
Figure 10:
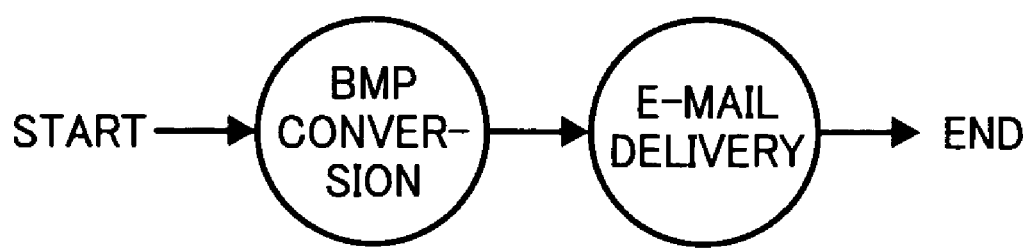
FIG. 10 is a diagram for explaining an exemplary workflow of data delivery in the data delivery system according to the fifth embodiment.

FIG. 9 is a schematic diagram of a data delivery system according to a fifth embodiment of the present invention. FIG. 10 is a diagram for explaining an exemplary workflow of data delivery in the data delivery system according to the fifth embodiment. The data delivery system according to the fifth embodiment is almost identical to that according to the first embodiment, except that the first data delivery apparatus 100 according to the fifth embodiment further includes a data transfer managing unit 107 that manages information regarding a plurality of destinations for data transfer registered in the workflow and a workflow processing job assigned to each destination.

When the workflow control unit 102 instructs the destination obtaining unit 105 to obtain the locations of the destinations from the workflow, then the destination obtaining unit 105 checks the data transfer managing unit 107 for the destinations performing the necessary workflow processing jobs and sends that information to the workflow control unit 102. As shown in FIG. 9, it is possible to register a plurality of destinations in the data transfer managing unit 107. Each destination performs a workflow processing job and has a certain priority to perform that workflow processing job. The rest of the structure of the data delivery system according to the fifth embodiment is almost identical to that according to the first embodiment. Hence, the description of the identical portion is not repeated.

As shown in FIG. 10, the input data is converted into BMP format in the first data delivery apparatus 100. The BMP data is then transferred to a data delivery apparatus registered in the data transfer managing unit 107 that has a higher priority to perform an e-mail delivery job. Given below is the detailed sequence of operations in the workflow processed in the data delivery system according to the fifth embodiment.

Basically, the sequence of operations in the workflow processed in the data delivery system according to the fifth embodiment is almost identical to that according to the fourth embodiment, except that while obtaining locations of the destinations that perform a necessary workflow processing job, the destination obtaining unit 105 checks the data transfer managing unit 107 for a destination that has a higher priority to perform that workflow processing job.

More particularly, when data is to be transferred to another data delivery apparatus for an e-mail delivery job, the workflow control unit 102 instructs the destination obtaining unit 105 to obtain from the data transfer managing unit 107 the location of a data delivery apparatus that has a higher priority to perform an e-mail delivery job (equivalent of Step S14 in FIG. 7).

The destination obtaining unit 105 then checks the destination obtaining unit 105 for a data delivery apparatus that satisfies the abovementioned condition. The data delivery apparatuses that perform an e-mail delivery job are shown to be the second data delivery apparatus 200 and the third data delivery apparatus 400 in FIG. 9. However, because the second data delivery apparatus 200 has a higher priority to perform an e-mail delivery job than the third data delivery apparatus 400, the destination obtaining unit 105 obtains the location of the second data delivery apparatus 200 and sends that information to the workflow control unit 102 (equivalent of Step S15 in FIG. 7).

Meanwhile, if there is no data delivery apparatus that performs a particular workflow processing job, then it is possible to perform the workflow processing job locally at the first data delivery apparatus 100.

The subsequent operations in the workflow are identical to Steps S16 to S19 according to the fourth embodiment. Hence, the description of those operations is not repeated.

Thus, in addition to the features according to the third embodiment or the fourth embodiment, it is possible to obtain location of a destination, which satisfies a particular condition for performing a workflow processing job, and automatically transfer data to that destination in the data delivery system according to the fifth embodiment.

Figure 11:
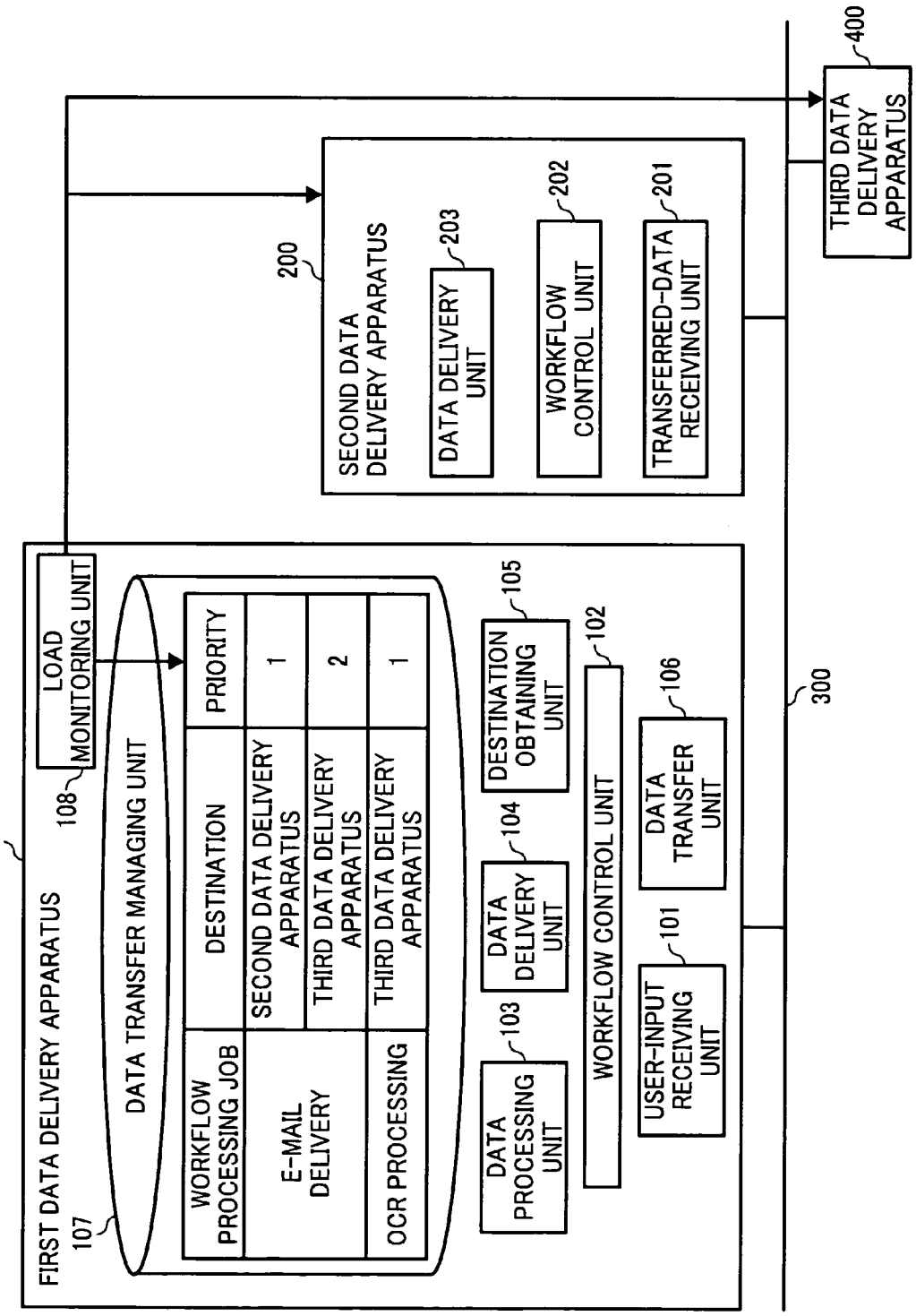
FIG. 11 is a schematic diagram of a data delivery system according to a sixth embodiment of the present invention.

FIG. 11 is a schematic diagram of a data delivery system according to a sixth embodiment of the present invention. The data delivery system according to the sixth embodiment is almost identical to that according to the fifth embodiment, except the first data delivery apparatus 100 according to the sixth embodiment further includes a load monitoring unit 108 that monitors the processing load on the destinations for data transfer registered in the workflow and changes the priority of the destinations based on the monitoring results.

More particularly, the load monitoring unit 108 monitors the processing load on, e.g., the second data delivery apparatus 200 and the third data delivery apparatus 400 registered in the data transfer managing unit 107. To achieve efficient load sharing of workflow processing jobs, it is necessary to determine a data delivery apparatus having less processing load for assigning thereto a workflow processing job. For this reason, the load monitoring unit 108 is used to monitor the processing load on the destinations registered in the data transfer managing unit 107 and prioritize the destinations in ascending order of the processing load. The rest of the structure of the data delivery system according to the sixth embodiment is identical to that according to the fifth embodiment. Hence, the description of the identical portion is not repeated.

Moreover, the sequence of operations in the workflow processed in the data delivery system according to the sixth embodiment is almost identical to that according to the fifth embodiment, except that the load monitoring unit 108 monitors the processing load on the destinations that perform a particular workflow processing job and prioritize those destinations in ascending order of the processing load.

Thus, in addition to the features according to the fifth embodiment, it is possible to prioritize the destinations that perform a workflow processing job in an ascending order of processing load in the data delivery system according to the sixth embodiment. Such a configuration of the data delivery system facilitates in constantly achieving efficient load sharing of workflow processing jobs.

Figure 12:
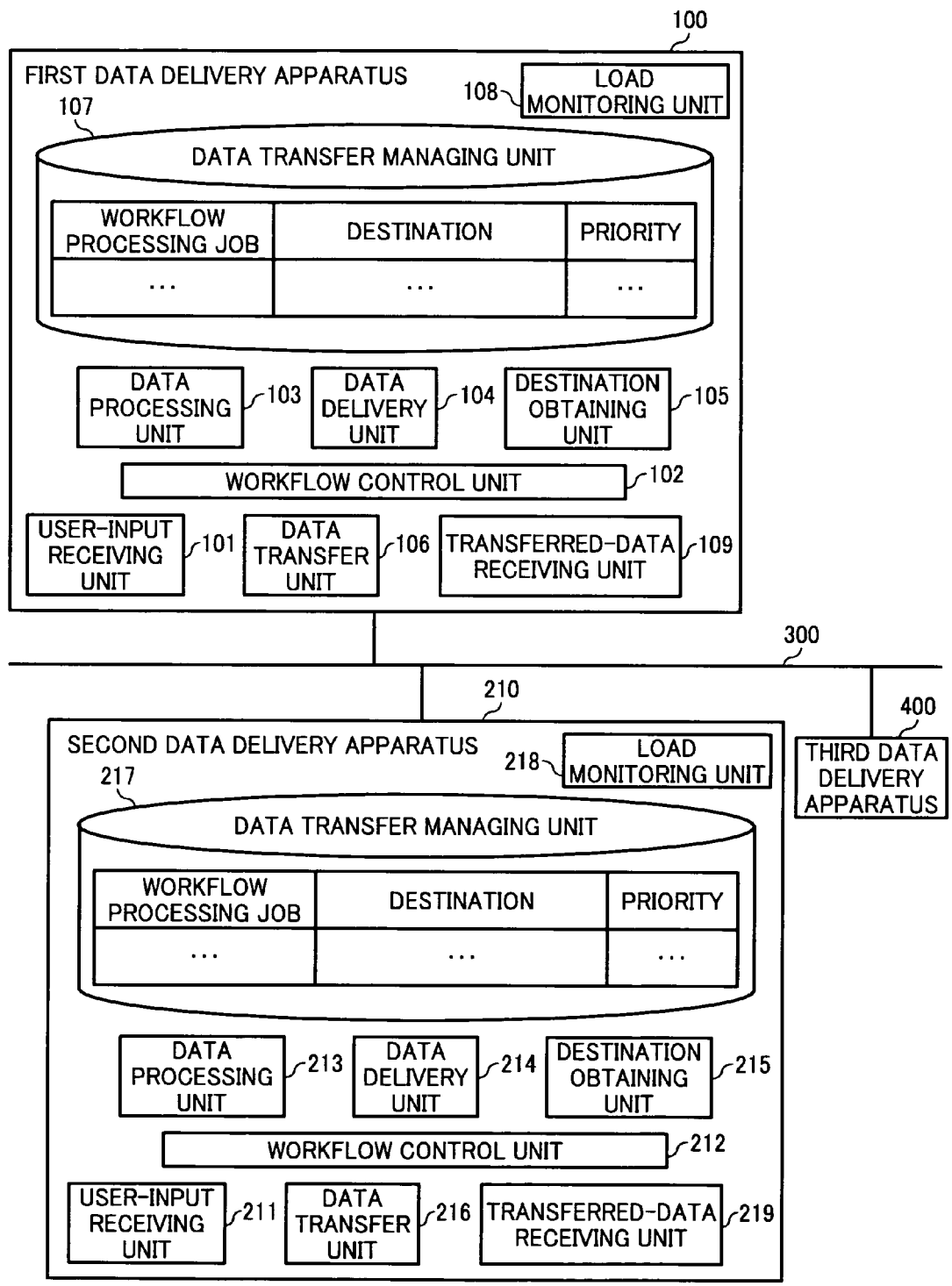
FIG. 12 is a schematic diagram of a data delivery system according to a seventh embodiment of the present invention.

FIG. 12 is a schematic diagram of a data delivery system according to a seventh embodiment of the present invention.

In addition to the constituent elements of the first data delivery apparatus 100 in the data delivery system according to the sixth embodiment, the first data delivery apparatus 100 in the data delivery system according to the seventh embodiment further includes a transferred-data receiving unit 109 for receiving data that is transferred from other data delivery apparatuses. Similarly, a second data delivery apparatus 210 in the data delivery system according to the seventh embodiment also includes a transferred-data receiving unit 219 for receiving data that is transferred from other data delivery apparatuses. Consequently, it is possible to perform a workflow processing job on the received data.

In this way, in addition to transferring data to other data delivery apparatuses, each data delivery apparatus in the data delivery system according to the seventh embodiment can receive data transferred from other data delivery apparatuses. As a result, it is possible to use a plurality of data delivery apparatuses for performing the workflow processing jobs and achieve efficient load sharing.

Apart from the transferred-data receiving unit 109, the first data delivery apparatus 100 has an identical structure to that according to the sixth embodiment (refer to FIG. 11). Meanwhile, the second data delivery apparatus 210 includes a user-input receiving unit 211, a workflow control unit 212, a data processing unit 213, a data delivery unit 214, a destination obtaining unit 215, a data transfer unit 216, a data transfer managing unit 217, a load monitoring unit 218, and the transferred-data receiving unit 219. Apart from the transferred-data receiving unit 219, the constituent elements in the second data delivery apparatus 210 are identical to those in the second data delivery apparatus 200 according to the sixth embodiment (refer to FIG. 11). Moreover, the transferred-data receiving unit 109 and the transferred-data receiving unit 219 are identical to the transferred-data receiving unit 201 in the second data delivery apparatus 200 according to the sixth embodiment (refer to FIG. 11). Hence, the description of the identical portion is not repeated. Furthermore, the third data delivery apparatus 400 in the data delivery system according to the seventh embodiment also has a structure identical to that of the first data delivery apparatus 100 and the second data delivery apparatus 210.

Given below is the sequence of operations in the workflow processed in the data delivery system according to the seventh embodiment. First, the user-input receiving unit 101 receives data and a workflow definition for processing the data via a user input. The user-input receiving unit 101 then requests the workflow control unit 102 to perform necessary workflow processing jobs on the input data based on the workflow. The workflow control unit 102 then instructs the data processing unit 103 to, e.g., convert the input data into BMP data as defined in the workflow and obtains the BMP data from the data processing unit 103.

If the next workflow processing job is, e.g., an OCR processing job to be performed in another data delivery apparatus, the workflow control unit 102 instructs the destination obtaining unit 105 to obtain the location of the data delivery apparatuses that perform OCR processing. The destination obtaining unit 105 checks the data transfer managing unit 107 for the data delivery apparatus that has the highest priority to perform an OCR processing job (i.e., the second data delivery apparatus 210 in this case) and sends that information to the workflow control unit 102. The workflow control unit 102 then sends the BMP data, the workflow definition, and the status of workflow processing to the data transfer unit 106, which in turn transfers that information to the second data delivery apparatus 210.

The transferred-data receiving unit 219 receives that information from the data transfer unit 106 and the data processing unit 213 performs the OCR processing job on the BMP data. If the next workflow processing job is, e.g., an e-mail delivery job, the workflow control unit 212 instructs the destination obtaining unit 215 to obtain the location of the data delivery apparatuses that perform an e-mail delivery job. The destination obtaining unit 215 checks the data transfer managing unit 217 for the data delivery apparatus that has the highest priority to perform an e-mail delivery job (i.e., the third data delivery apparatus 400 in this case) and sends that information to the workflow control unit 212.

The workflow control unit 212 then sends the OCR-processed data, the workflow, and the status of workflow processing to the data transfer unit 216, which in turn transfers that information to the third data delivery apparatus 400.

Thus, in addition to the features according to the sixth embodiment, it is possible to repeat data transfers in the data delivery system according to the seventh embodiment such that a plurality of workflow processing jobs can be performed. Such a configuration of the data delivery system facilitates in constantly achieving efficient load sharing of a plurality of workflow processing jobs.

Figure 13:
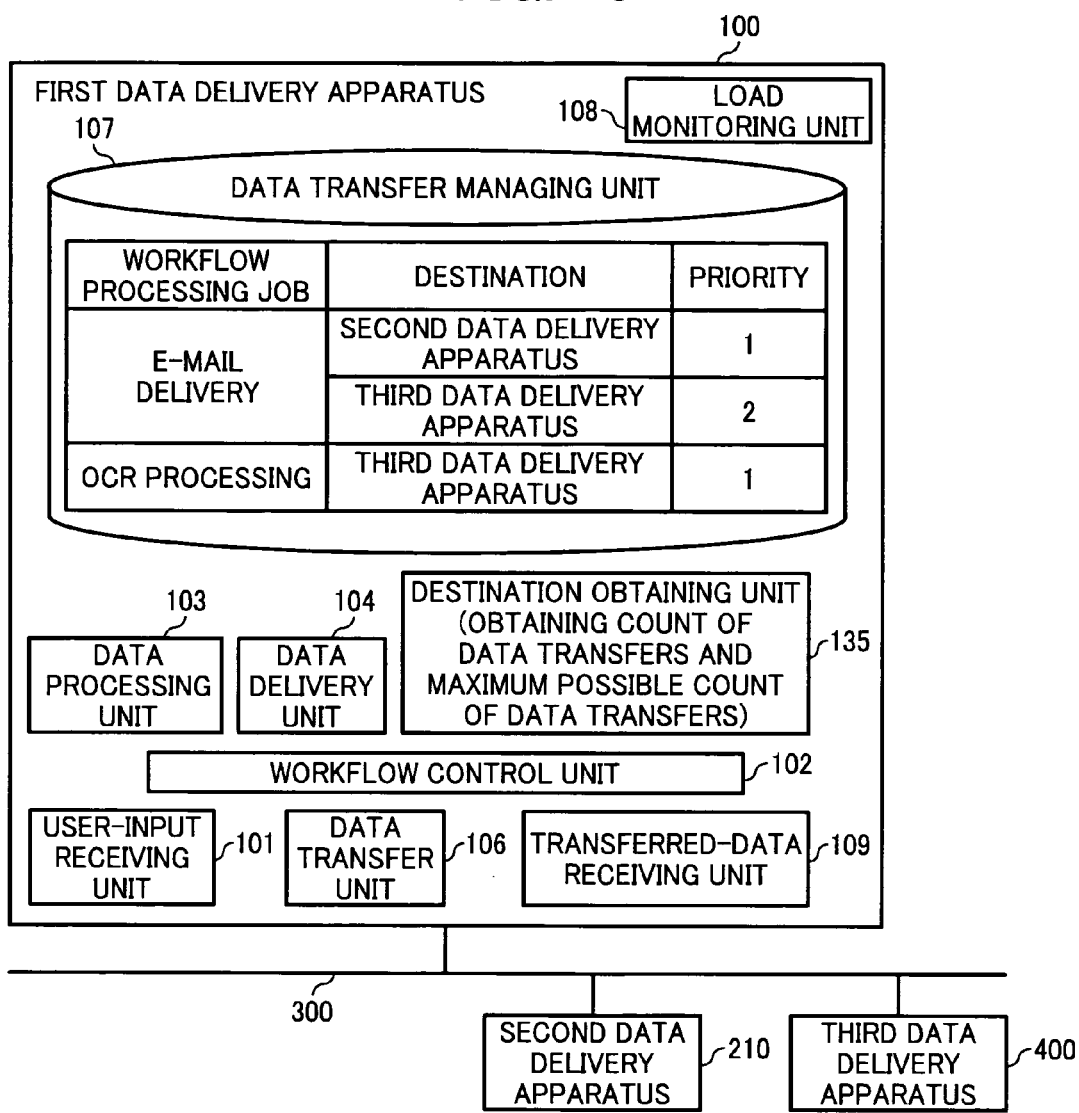
FIG. 13 is a schematic diagram of a data delivery system according to an eighth embodiment of the present invention.
Figure 14:
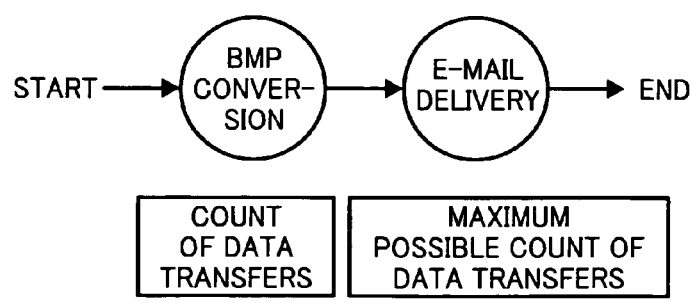
FIG. 14 is a diagram for explaining an exemplary workflow of data delivery in the data delivery system according to the eighth embodiment.

FIG. 13 is a schematic diagram of a data delivery system according to an eighth embodiment of the present invention. FIG. 14 is a diagram for explaining an exemplary workflow of data delivery in the data delivery system according to the eighth embodiment. The first data delivery apparatus 100 in the data delivery system according to the eighth embodiment is almost identical to that according to the seventh embodiment, except that it includes a destination obtaining unit 135 instead of the destination obtaining unit 105. The destination obtaining unit 135 further includes a transfer-count obtaining unit (not shown) that obtains updated count of data transfers and a transfer-count specifying unit (not shown) that enables a user to specify a maximum possible count of data transfers. Moreover, the transferred-data receiving unit 109 includes a transfer-count updating unit that updates the count of data transfers each time the transferred-data receiving unit 109 receives a workflow processing job.

If the updated count obtained by the transfer-count obtaining unit exceeds the maximum possible count specified in the transfer-count specifying unit, the transfer-count obtaining unit restricts further data transfers. As a result, it is possible to prevent inefficient load sharing of workflow processing jobs.

Given below is the sequence of operations in the workflow processed in the data delivery system according to the eighth embodiment. First, a user can specify in advance a maximum possible count of data transfers in a workflow from the transfer-count specifying unit (refer to FIG. 14). The transfer-count updating unit updates the count of data transfers each time the transferred-data receiving unit 109 receives a workflow processing job. When the updated count obtained by the transfer-count obtaining unit exceeds the maximum possible count specified at the transfer-count specifying unit, the transfer-count obtaining unit restricts further data transfers.

Thus, in addition to the features according to the seventh embodiment, it is possible to control the number of data transfers that can be performed in the data delivery system according to the eighth embodiment. Such a configuration of the data delivery system prevents inefficient load sharing of workflow processing jobs.

Moreover, because the transfer-count updating unit updates the count of data transfers each time the transferred-data receiving unit 109 receives a workflow processing job, it is possible to reliably manage the restriction on data transfers in the data delivery system according to the eighth embodiment.

Figure 15:
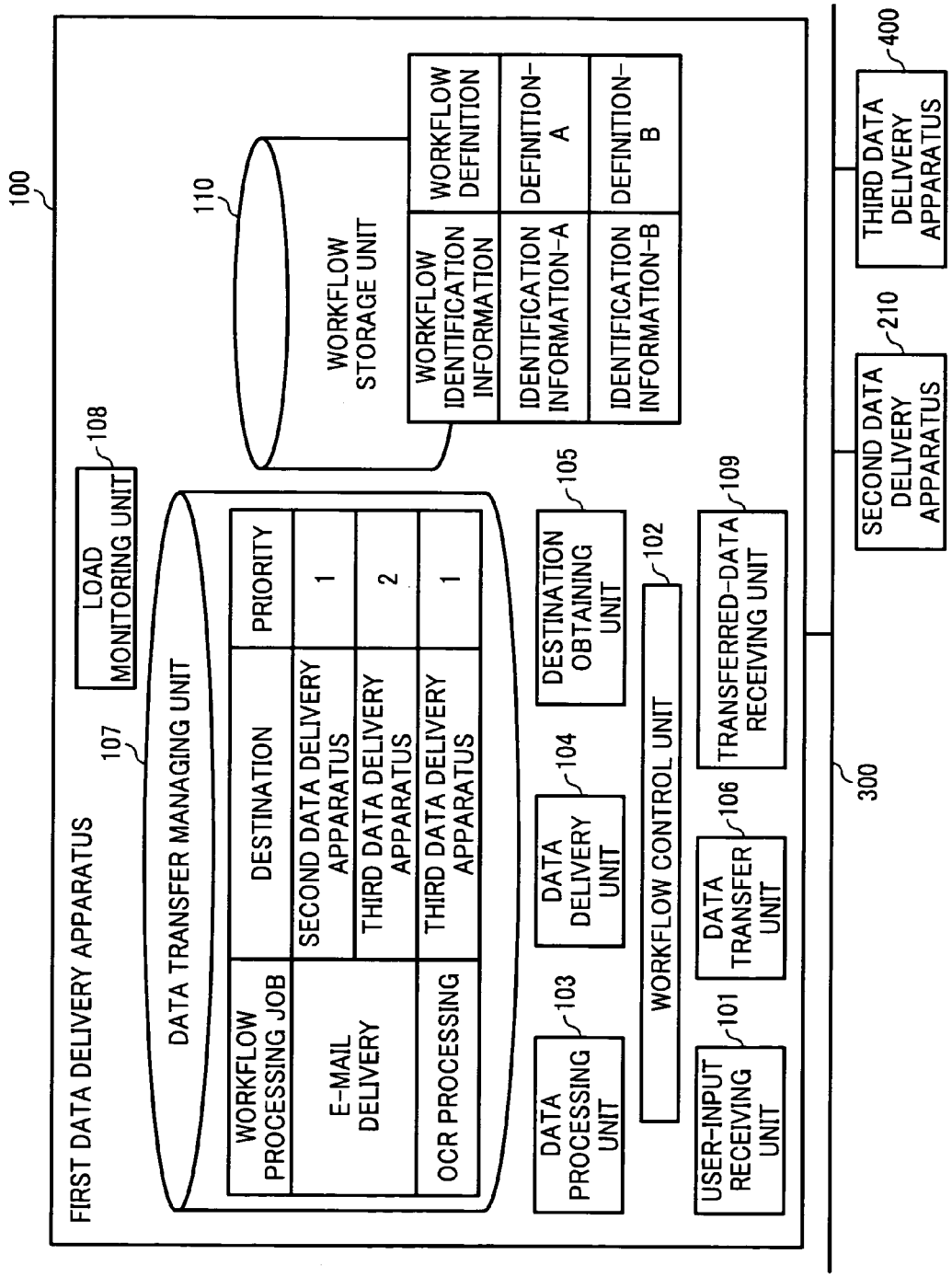
FIG. 15 is a schematic diagram of a data delivery system according to a ninth embodiment of the present invention.

FIG. 15 is a schematic diagram of a data delivery system according to a ninth embodiment of the present invention. The data delivery system according to the ninth embodiment is almost identical to that according to the seventh embodiment or the eighth embodiment, except that the first data delivery apparatus 100 according to the ninth embodiment further includes a workflow storage unit 110 that stores therein workflow definitions and workflow identification information corresponding to the defined workflows. The second data delivery apparatus 210 and the third data delivery apparatus 400 also include a similar workflow storage unit (not shown).

As described in the data delivery system according the first to seventh embodiments, the load sharing of workflow processing jobs is performed by transferring the whole workflow definition to other data delivery apparatuses. However, instead of the whole workflow definition, the corresponding workflow identification information is transferred to other data delivery apparatuses in the data delivery system according to the ninth embodiment. The workflow storage unit in each data delivery apparatus receives workflow identification information and obtains a workflow definition corresponding to the received workflow identification information such that workflow processing jobs can be performed based on the obtained workflow. Given below is the sequence of operations in the workflow processed in the data delivery system according to the ninth embodiment. First, the user-input receiving unit 101 receives data and a workflow definition for processing the data via a user input. The data processing unit 103 performs a workflow processing job. The destination obtaining unit 105 checks the data transfer managing unit 107 for the destinations performing further necessary workflow processing jobs and sends that information to the workflow control unit 102. The workflow control unit 102 then accesses the workflow storage unit 110 to obtain identification information-A corresponding to a definition-A, and sends the processed data, the identification information-A, and the status of workflow processing to the data transfer unit 106. The data transfer unit 106 transfers the received information to, e.g., the second data delivery apparatus 210.

The transferred-data receiving unit 219 receives the information from the data transfer unit 106 and requests the workflow control unit 212 to perform necessary workflow processing jobs. Because the transferred-data receiving unit 219 receives only the identification information-A, the workflow control unit 212 can obtain only the definition-A by accessing the corresponding workflow storage unit.

Based on the definition-A, the workflow control unit 212 then instructs the data delivery unit 214 to perform e-mail delivery of the received data. The workflow is complete when the data delivery unit 214 performs e-mail delivery of the received data.

Similarly, it is possible to transfer workflow identification information from the second data delivery apparatus 210 to the third data delivery apparatus 400. In that case, the workflow control unit 212 accesses the corresponding workflow storage unit to obtain the workflow identification information and sends it to the third data delivery apparatus 400.

Thus, in addition to the features according to the seventh embodiment or the eighth embodiment, it is not necessary to transfer a whole workflow definition to other data delivery apparatuses in the data delivery system according to the ninth embodiment. That is, by transferring only the workflow identification information corresponding to a workflow definition, the volume of data to be transferred can be reduced. Such a configuration of the data delivery system facilitates in reducing the time for data transfers and in achieving speedy load sharing of a large number of workload processing jobs over a network.

Figure 16:
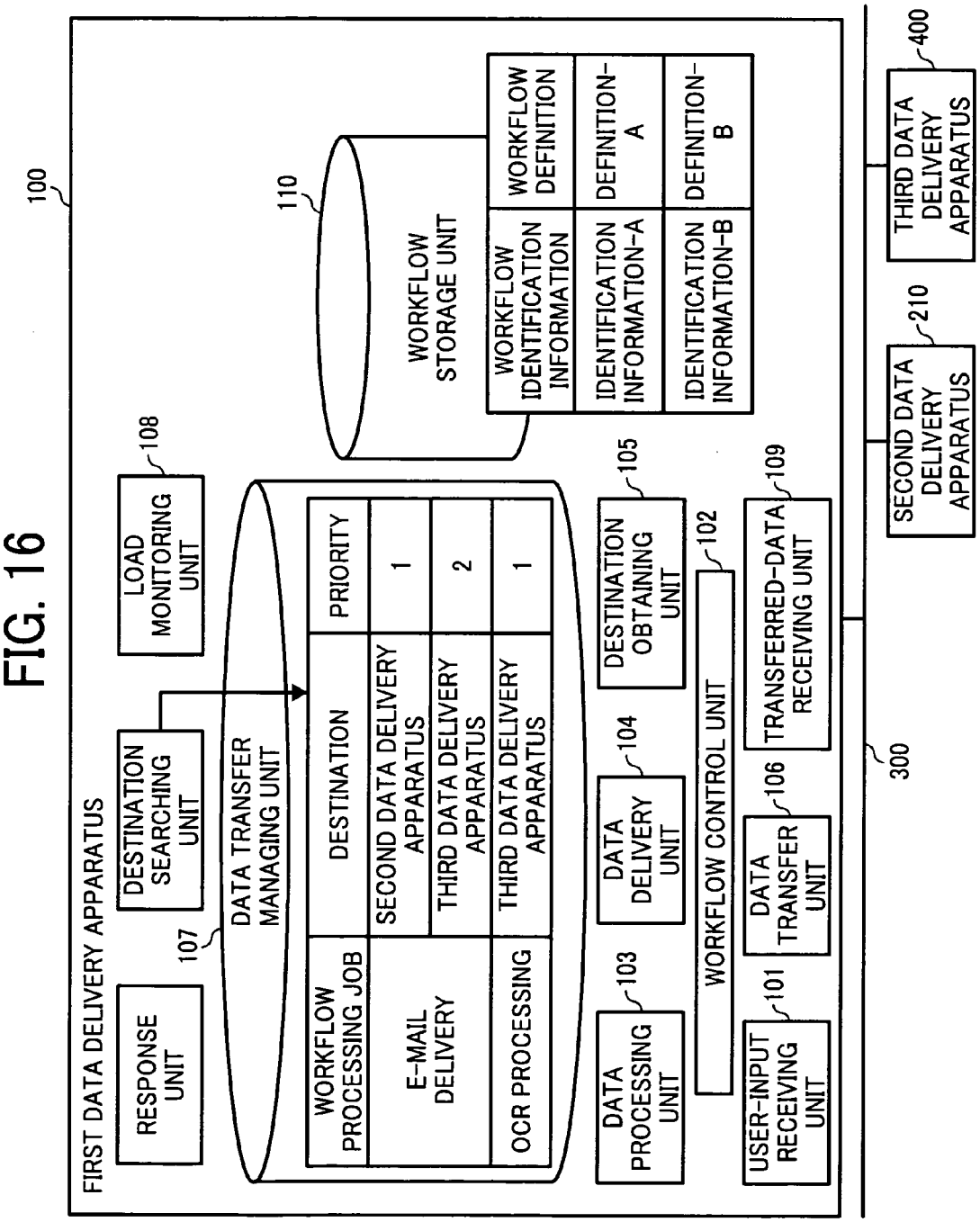
FIG. 16 is a schematic diagram of a data delivery system according to a tenth embodiment of the present invention.
Figure 17:
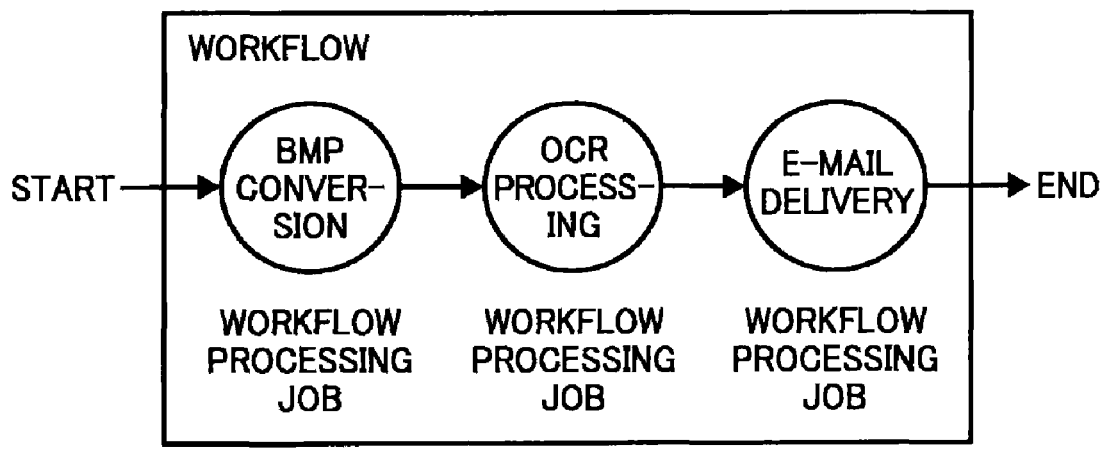
FIG. 17 is a diagram for explaining an exemplary workflow of data delivery in a conventional data delivery system.
Figure 18:
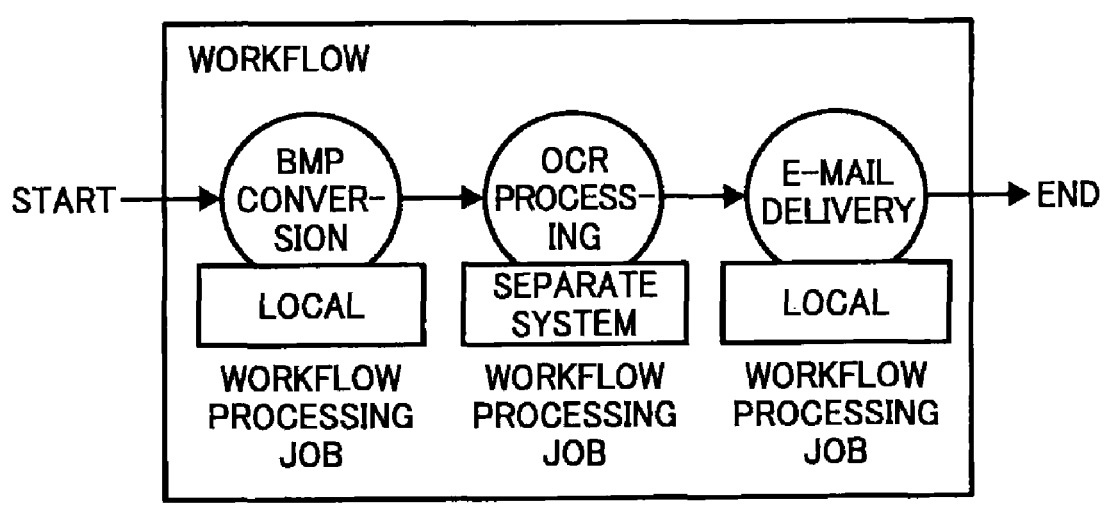
FIG. 18 is a diagram for explaining an exemplary workflow in which one or more of workflow processing jobs are processed in a different system.
Figure 19:
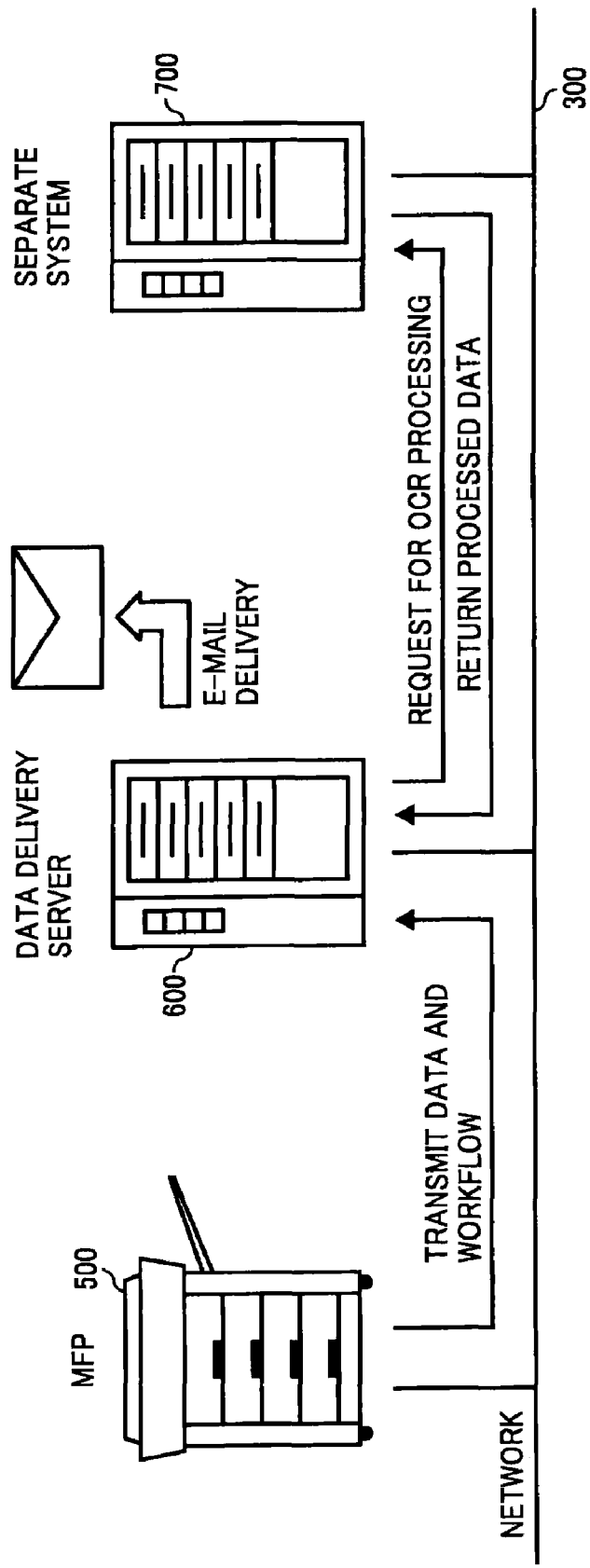
FIG. 19 is a schematic diagram of a conventional data delivering system.

FIG. 16 is a schematic diagram of a data delivery system according to a tenth embodiment of the present invention. The data delivery system according to the tenth embodiment is almost identical to that according to the ninth embodiment, except that each of the first data delivery apparatus 100, the second data delivery apparatus 210, and the third data delivery apparatus 400 further includes a destination searching unit that searches destinations for data transfer (i.e., data delivery apparatuses over the network 300) and a response unit that responds to destination-search queries from other data delivery apparatuses.

The search for a destination is complete when a destination searching unit receives a response from a response unit in another data delivery apparatus. In the case of the first data delivery apparatus 100, after receiving a response from a response unit of another data delivery apparatus, the destination searching unit registers the corresponding data delivery apparatus and a workflow processing job assigned thereto in the data transfer managing unit 107.

The response unit in the searched data delivery apparatus responds to a destination-search query from the destination searching unit of the first data delivery apparatus 100. The response of a response unit can be in the form of workflow identification information, a workflow processing job processable in the searched data delivery apparatus, or a priority attached to the searched data delivery apparatus.

Thus, when the destination searching unit in the first data delivery apparatus 100 searches a data delivery apparatus for data transfer over the network 300, a response unit of the searched data delivery apparatus responds to the destination searching unit whether the data to be transferred is processable in the searched data delivery apparatus.

As described above, after receiving a response from a response unit of the searched data delivery apparatus, the destination searching unit of the first data delivery apparatus 100 registers the searched data delivery apparatus and a workflow processing job assigned thereto in the data transfer managing unit 107. For example, when the response includes workflow identification information of a workflow processable in the searched data delivery apparatus, the destination searching unit of the first data delivery apparatus 100 verifies the responded workflow identification information in the workflow storage unit 110. If the responded workflow identification information cannot be verified in the workflow storage unit 110, the destination searching unit either does not register the searched data delivery apparatus as a destination in the data transfer managing unit 107 or newly registers a workflow definition corresponding to the responded workflow identification information. Similarly, when the response includes a workflow processing job processable in the searched data delivery apparatus, the destination searching unit updates the information in the data transfer managing unit 107. Moreover, when the response includes the latest priority of the searched data delivery apparatus, the destination searching unit can be configured to update the priority in the data transfer managing unit 107. Thus, in addition to the features according to the ninth embodiment, it is possible to search data delivery apparatuses over the network in the data delivery system according to the tenth embodiment. As a result, even if a data delivery apparatus is added to or removed from the data delivery system, it is always possible to register updated information in the data transfer managing unit 107.

Such a configuration of the data delivery system facilitates in achieving efficient load sharing of workflow processing jobs.

Meanwhile, the hardware configuration of a data delivery apparatus according to the first to tenth embodiments is similar to a personal computer. That is, a data delivery apparatus includes a control unit such as a central processing unit (CPU), a memory device such as a read only memory (ROM) or a random access memory (RAM), an external storage device such as a hard disk drive (HDD) or a compact disk drive (CD-drive), a display device, and an input device such as a keyboard or a mouse. Moreover, a data delivery apparatus can be a data delivery server that does not include a display device or an input device.

A data delivery program executed in the data delivery system according to the first to tenth embodiments is provided in the form of an installable or executable file on a computer-readable storage device such as a compact disk read only memory (CD-ROM), a flexible disk (FD), a compact disk recordable (CD-R), or a digital versatile disk (DVD).

Alternatively, the data delivery program executed in the data delivery system according to the first to tenth embodiments can be saved as a downloadable file on a personal computer connected to a network such as Internet or can be made available for distribution through the network.

Moreover, the data delivery program executed in the data delivery system according to the first to tenth embodiments can be installed in the ROM of a personal computer that is used to execute the program.

Furthermore, an MFP user over a network can use the data delivery system according to the first to tenth embodiments to achieve load sharing of workflow processing jobs between a plurality of data delivery servers connected over the same network.

Thus, according to an aspect of the present invention, because a workflow can be defined such that a first data delivery apparatus in the data delivery system performs only a part of workflow processing jobs and then request a second data delivery apparatus to perform the remaining workflow processing jobs, it is possible for the first data delivery apparatus to become free from managing one workflow and start managing another workflow. Such a configuration of the data delivery system facilitates in achieving efficient load sharing of workflow processing jobs.

Moreover, because a data delivery program executed in the data delivery system is provided in the form of an installable or executable file on a computer-readable storage device, it is possible to generate the data delivery program that can free a data delivery apparatus midway through processing a workflow and achieve efficient load sharing of workflow processing jobs.

Furthermore, because the data delivery program is provided on a computer-readable storage device, it can be made available for distribution and executed on a plurality of personal computers over a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data delivery system comprising:
a plurality of data delivery apparatuses that process input data based on a predefined workflow, the data delivery apparatuses including at least a first data delivery apparatus that receives a request for executing the workflow from a user and a second data delivery apparatus that receives a request for completing a partly executed workflow, wherein
the first data delivery apparatus includes
a user-input receiving unit that receives target data to be processed and the request for executing the workflow,
a first data processing unit that processes the target data following a workflow definition defined in the workflow,
a destination obtaining unit that obtains a transfer destination data delivery apparatus described in the workflow,
and a transferring unit that transfers the target data, the workflow definition, and a progress of the workflow to the transfer destination data delivery apparatus, and
the second data delivery apparatus includes
a transfer receiving unit that receives the target data, the workflow definition, and the progress of the workflow from other data delivery apparatus,
a workflow executing unit that executes the workflow from a non-executed part based on the progress of the workflow, and
a data delivery unit that delivers data to other destination,
wherein the destination obtaining unit registers a plurality of transfer destination data delivery apparatuses,
wherein the destination obtaining unit sets a priority to a plurality of registered transfer destination data delivery apparatuses and selects a transfer destination data delivery apparatus from the registered transfer destination data delivery apparatuses based on the priority,
wherein the first data delivery apparatus further includes a load monitoring unit that monitors a processing load of the transfer destination data delivery apparatus, and
the destination obtaining unit changes the priority based on a result of monitoring the processing load.

2. The data delivery system according to claim 1, wherein the second data delivery apparatus further includes a second data processing unit that performs a predetermined process on the target data.

3. The data delivery system according to claim 1, wherein
the first data delivery apparatus further includes a transfer condition managing unit that at least manages the transfer destination data delivery apparatus and a transfer condition for the transfer destination data delivery apparatus, wherein
when the transfer condition is satisfied during an execution of the workflow, the transferring unit transfers the target data, the workflow definition, and the progress of the workflow to the transfer destination data delivery apparatus.

4. The data delivery system according to claim 1, wherein
each of the data delivery apparatuses in the data delivery system includes at least the transfer receiving unit, the destination obtaining unit, the transferring unit, and the transfer condition managing unit, and
upon receiving a workflow from another data delivery apparatus, the data delivery apparatus further transfers a received workflow to still another data delivery apparatus.

5. The data delivery system according to claim 1, wherein
each of the data delivery apparatuses further includes a workflow storage unit that stores therein the workflow definition and corresponding workflow identification information, and
the transferring unit transfers to the workflow identification information instead of the workflow definition to a transfer destination, and the workflow storage unit of the transfer destination obtains the workflow definition based on received workflow identification information, and continues to execute the workflow.

6. The data delivery system according to claim 1, wherein each of the data delivery apparatuses in the data delivery system includes
   a destination searching unit that searches a transfer destination data delivery apparatus on the network, and
   a responding unit that responds to a search query from the destination searching unit of other data delivery apparatus; and
upon receiving a response to the search query from the other data delivery apparatus, the destination searching unit registers a data delivery apparatus that is a candidate for the transfer destination data delivery apparatus in the transfer condition managing unit.

7. A data delivery system comprising:
a plurality of data delivery apparatuses that process input data based on a predefined workflow, the data delivery apparatuses including at least a first data delivery apparatus that receives a request for executing the workflow from a user and a second data delivery apparatus that receives a request for completing a partly executed workflow, wherein
the first data delivery apparatus includes
a user-input receiving unit that receives target data to be processed and the request for executing the workflow,
a first data processing unit that processes the target data following a workflow definition defined in the workflow,
a destination obtaining unit that obtains a transfer destination data delivery apparatus described in the workflow, and
a transferring unit that transfers the target data, the workflow definition, and a progress of the workflow to the transfer destination data delivery apparatus, and
the second data delivery apparatus includes
a transfer receiving unit that receives the target data, the workflow definition, and the progress of the workflow from other data delivery apparatus,
a workflow executing unit that executes the workflow from a non-executed part based on the progress of the workflow, and
a data delivery unit that delivers data to other destination,
wherein the destination obtaining unit registers a plurality of transfer destination data delivery apparatuses,
wherein the first data delivery apparatus further includes a transfer condition managing unit that at least manages the transfer destination data delivery apparatus and a transfer condition for the transfer destination data delivery apparatus,
wherein when the transfer condition is satisfied during an execution of the workflow, the transferring unit transfers the target data, the workflow definition, and the progress of the workflow to the transfer destination data delivery apparatus,
wherein each of the data delivery apparatuses in the data delivery system includes at least the transfer receiving unit, the destination obtaining unit, the transferring unit, and the transfer condition managing unit, and
upon receiving a workflow from another data delivery apparatus, the data delivery apparatus further transfers a received workflow to still another data delivery apparatus,
wherein the destination obtaining unit includes
a transfer-count obtaining unit that obtains a count of workflow transfers, and
a transfer-count specifying unit that specifies a maximum possible count of workflow transfers, and
the transfer receiving unit includes a transfer-count updating unit that updates the count of workflow transfers each time the workflow is received, and
when the count of workflow transfers obtained by the transfer-count obtaining unit exceeds the maximum possible count of workflow transfers the data delivery apparatus restricts the workflow transfer.

8. A method of delivering data in a data delivery system including a plurality of data delivery apparatuses that process input data based on a predefined workflow, the data delivery apparatuses including at least a first data delivery apparatus that receives a request for executing the workflow from a user and a second data delivery apparatus that receives a request for completing a partly executed workflow, the method comprising:
using the first data delivery apparatus,
   receiving target data to be processed;
   receiving the request for executing the workflow;
   processing the target data defined in the workflow;
   obtaining the location of a transfer destination data delivery apparatus described in the workflow;
   registering a plurality of transfer destination data delivery apparatuses;
   setting a priority to a plurality of registered transfer destination data delivery apparatuses;
   selecting a transfer destination data delivery apparatus from the registered transfer destination data delivery apparatuses based on the priority;
   monitoring a processing load of the transfer destination data delivery apparatus;
   changing the priority based on a result of monitoring the processing load;
   transferring the target data, the workflow definition, and a progress of the workflow to the transfer destination data delivery apparatus; and
using the second data delivery apparatus,
   receiving the target data, the workflow definition, and the progress of the workflow from other data delivery apparatus;
   executing the workflow from a non-executed part based on the progress of the workflow; and
   delivering data to other destination.

* * * * *